(12) United States Patent
Markan et al.

US011483366B2

(10) Patent No.: US 11,483,366 B2
(45) Date of Patent: Oct. 25, 2022

(54) COLLABORATIVELY ANNOTATING STREAMING VIDEOS ON MOBILE DEVICES

(71) Applicant: Freshdesk Inc., San Bruno, CA (US)

(72) Inventors: Vineet Markan, Pune (IN); Rohit Agarwal, Delhi (IN)

(73) Assignee: Freshworks, Inc., San Mateo, CA (US)

( * ) Notice: Subject to any disclaimer, the term of this patent is extended or adjusted under 35 U.S.C. 154(b) by 243 days.

(21) Appl. No.: 15/602,660

(22) Filed: May 23, 2017

(65) Prior Publication Data

US 2017/0257413 A1 Sep. 7, 2017

Related U.S. Application Data

(63) Continuation-in-part of application No. 15/309,384, filed as application No. PCT/IN2015/000211 on May 18, 2015, now abandoned.

(Continued)

(51) Int. Cl.
*G06F 3/048* (2013.01)
*H04L 65/75* (2022.01)
(Continued)

(52) U.S. Cl.
CPC .......... *H04L 65/764* (2022.05); *G06F 3/0488* (2013.01); *G06F 3/04855* (2013.01);
(Continued)

(58) Field of Classification Search
CPC ............. G06F 17/30882; G06F 17/241; G06F 3/04855; G06F 3/0488; G06F 40/169; G11B 27/036; G11B 27/34; G11B 27/102; H04L 65/604; H04L 65/1063; H04L 65/403; H04L 65/764
See application file for complete search history.

(56) References Cited

U.S. PATENT DOCUMENTS 5,550,982 A * 8/1996 Long .................. H04L 29/06
719/330
7,714,909 B2 * 5/2010 Lord .................... G06F 17/241
348/207.99

(Continued)

OTHER PUBLICATIONS

Hua Lu, "Non Final Office Action", dated Aug. 28, 2018, U.S. Appl. No. 15/309,384.

(Continued)

*Primary Examiner* — Mohamed Abou El Seoud
(74) *Attorney, Agent, or Firm* — LeonardPatel PC; Sheetal S. Patel; Michael A. Leonard, II

(57) ABSTRACT

A process for annotating a video in real-time on a mobile device. The process may include creating one or more markers, allowing a user of the mobile device to annotate the video while one or more users within a group of users are annotating the streaming video in real-time. The process may include receiving a selection from the user for which he or she seeks to annotate within the video. The process further includes displaying a text box for a frame or range of frames selected by the user seeks for annotation, and receiving a submitted text box from the user and propagating the annotations within the submitted text box to one or more users within the group in real-time.

17 Claims, 17 Drawing Sheets

Related U.S. Application Data

(60) Provisional application No. 62/000,016, filed on May 19, 2014.

(51) Int. Cl.
　　　*H04L 65/403*　　　(2022.01)
　　　*G06F 3/0488*　　　(2022.01)
　　　*G06F 3/04855*　　(2022.01)
　　　*H04L 65/1063*　　(2022.01)
　　　*G11B 27/34*　　　(2006.01)
　　　*G11B 27/10*　　　(2006.01)
　　　*G06F 40/169*　　 (2020.01)

(52) U.S. Cl.
　　　CPC ......... *G06F 40/169* (2020.01); *G11B 27/102* (2013.01); *G11B 27/34* (2013.01); *H04L 65/1063* (2013.01); *H04L 65/403* (2013.01)

(56) References Cited

U.S. PATENT DOCUMENTS

| | | | |
|---|---|---|---|
| 9,275,684 B2* | 3/2016 | Amento | H04N 21/4788 |
| 9,684,644 B2* | 6/2017 | Badoiu | G06F 40/169 |
| 2010/0281373 A1* | 11/2010 | Pueyo | H04N 21/21 |
| | | | 715/723 |
| 2011/0213789 A1* | 9/2011 | Doshi | G06F 21/6218 |
| | | | 707/754 |
| 2012/0036423 A1* | 2/2012 | Haynes, II | G06Q 30/0201 |
| | | | 715/230 |
| 2012/0151347 A1 | 6/2012 | McClements | |
| 2012/0308204 A1 | 12/2012 | Hwang | |
| 2013/0145269 A1* | 6/2013 | Latulipe | G06F 3/048 |
| | | | 715/720 |
| 2014/0063174 A1* | 3/2014 | Junuzovic | G06Q 10/101 |
| | | | 348/14.02 |

OTHER PUBLICATIONS

Pranav Kumar "International Search Report" issued by the Indian Patent Office for PCT/IN2015/000211 dated Oct. 30, 2015.

Pranav Kumar, "Written Opinion for International Search Report" issued by Indian Patent Office for PCT/IN2015/000211 dated Oct. 30, 2015.

* cited by examiner

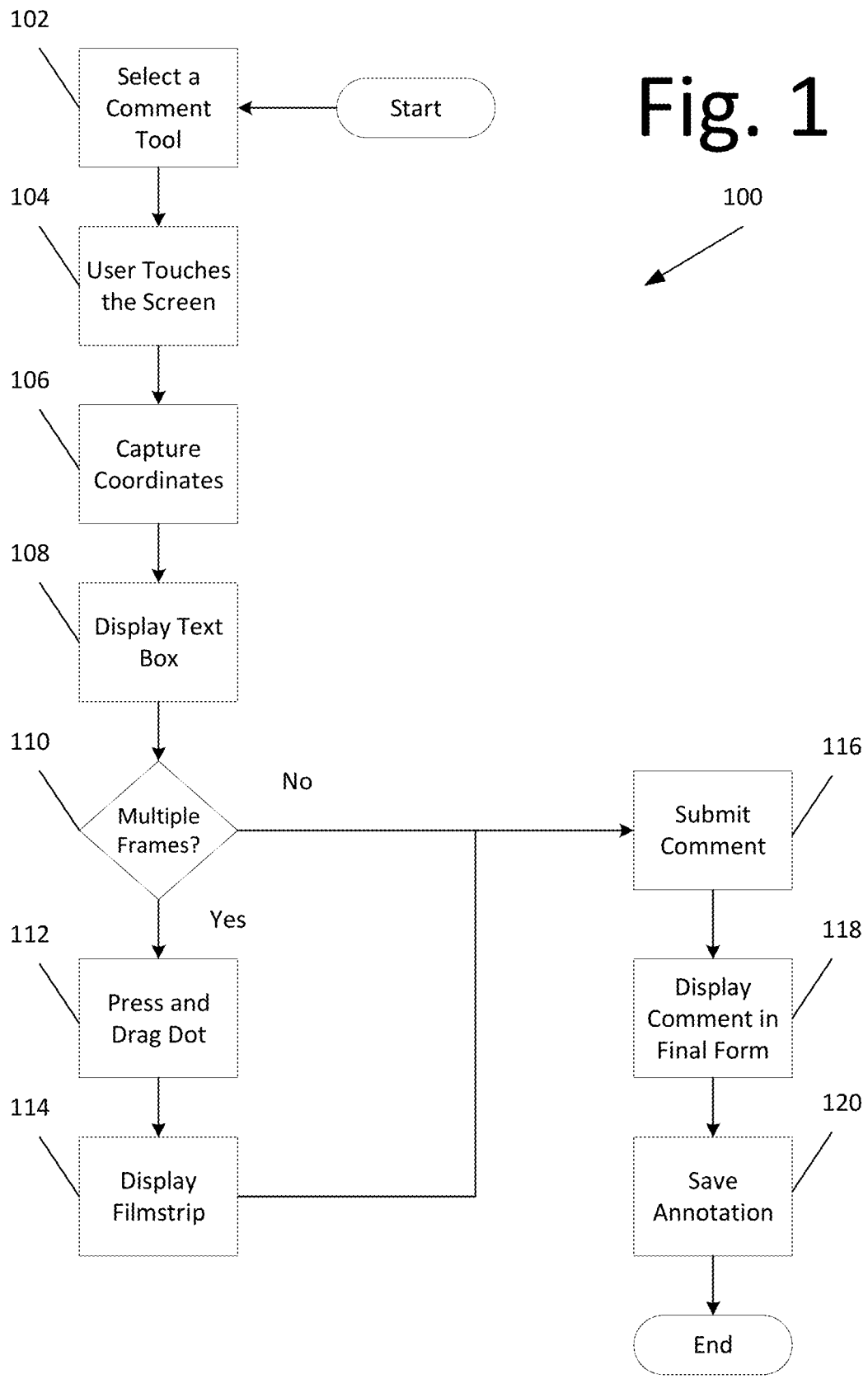

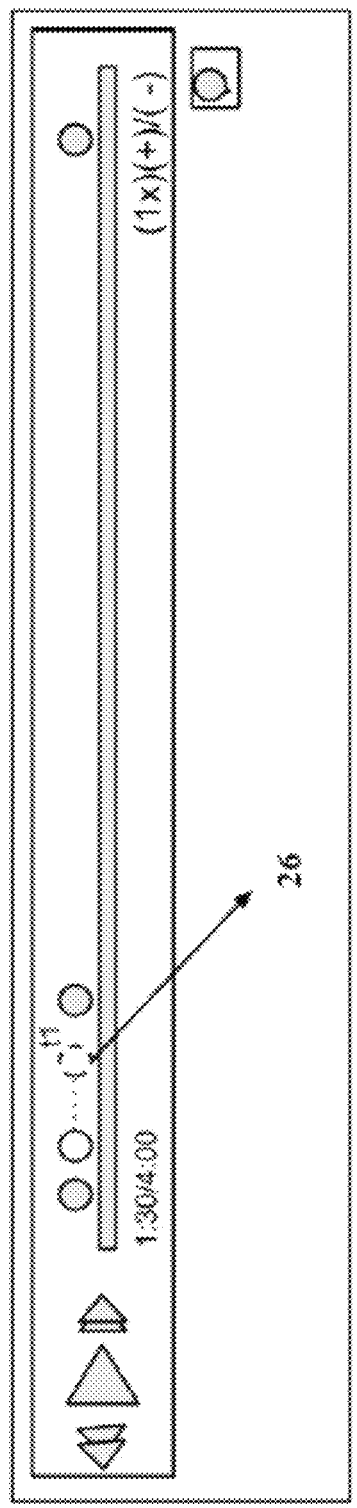

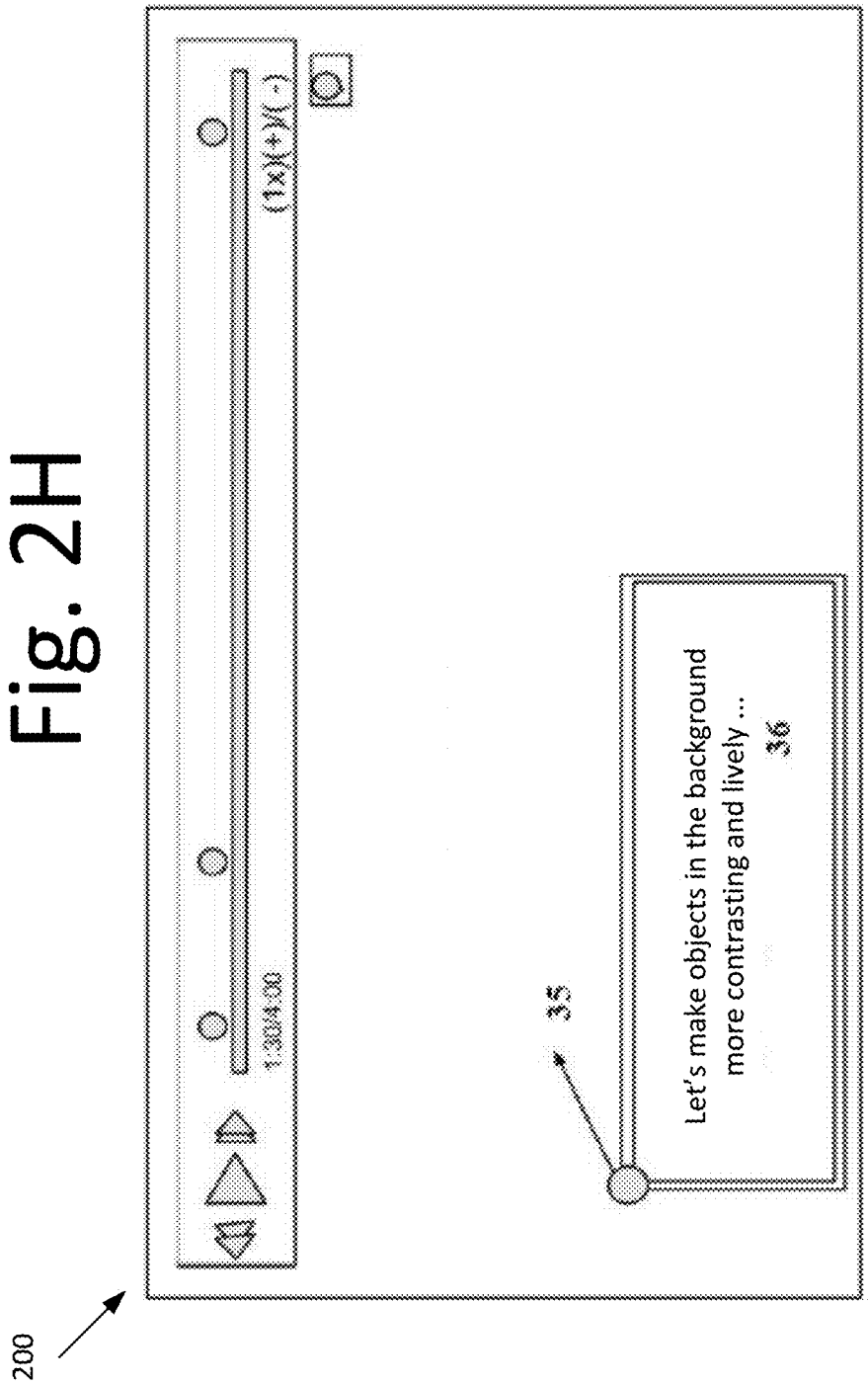

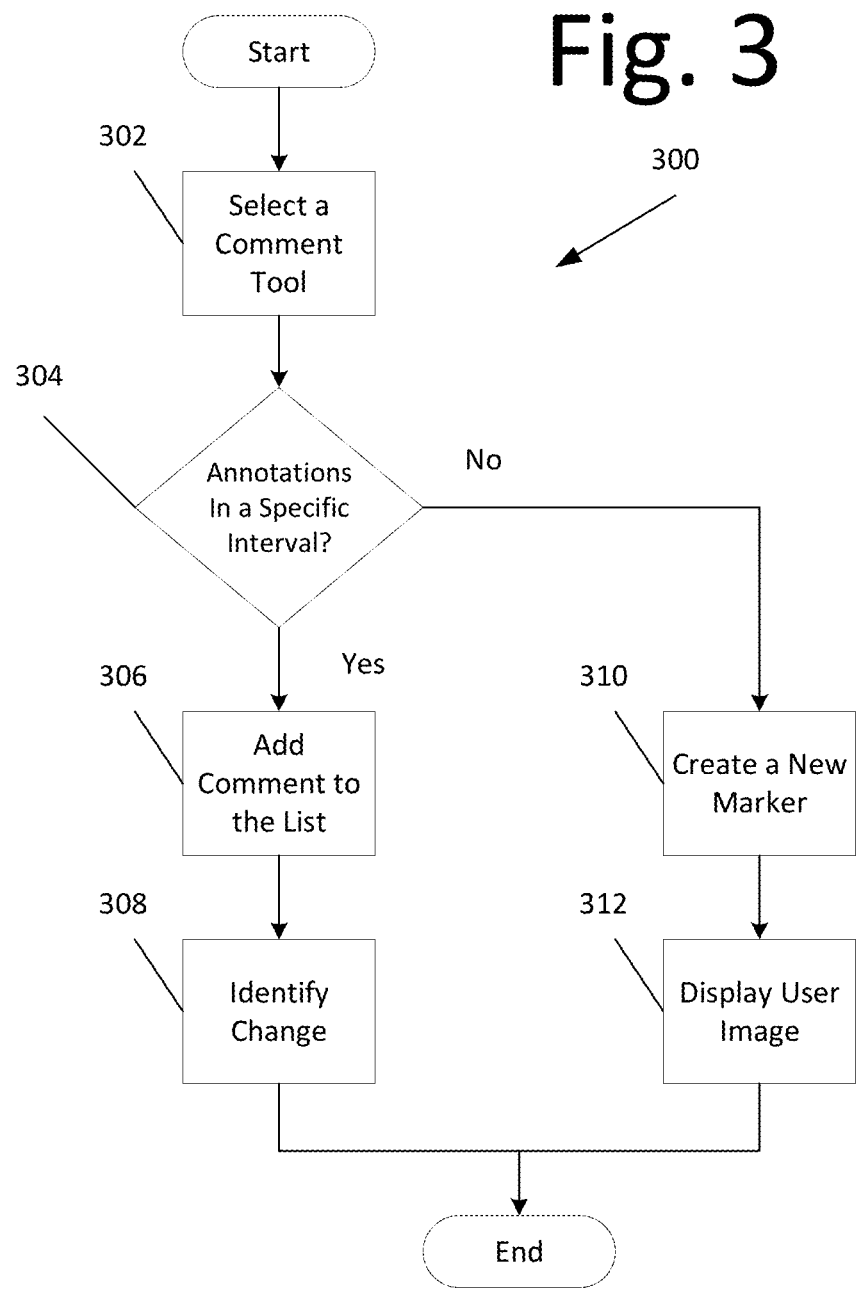

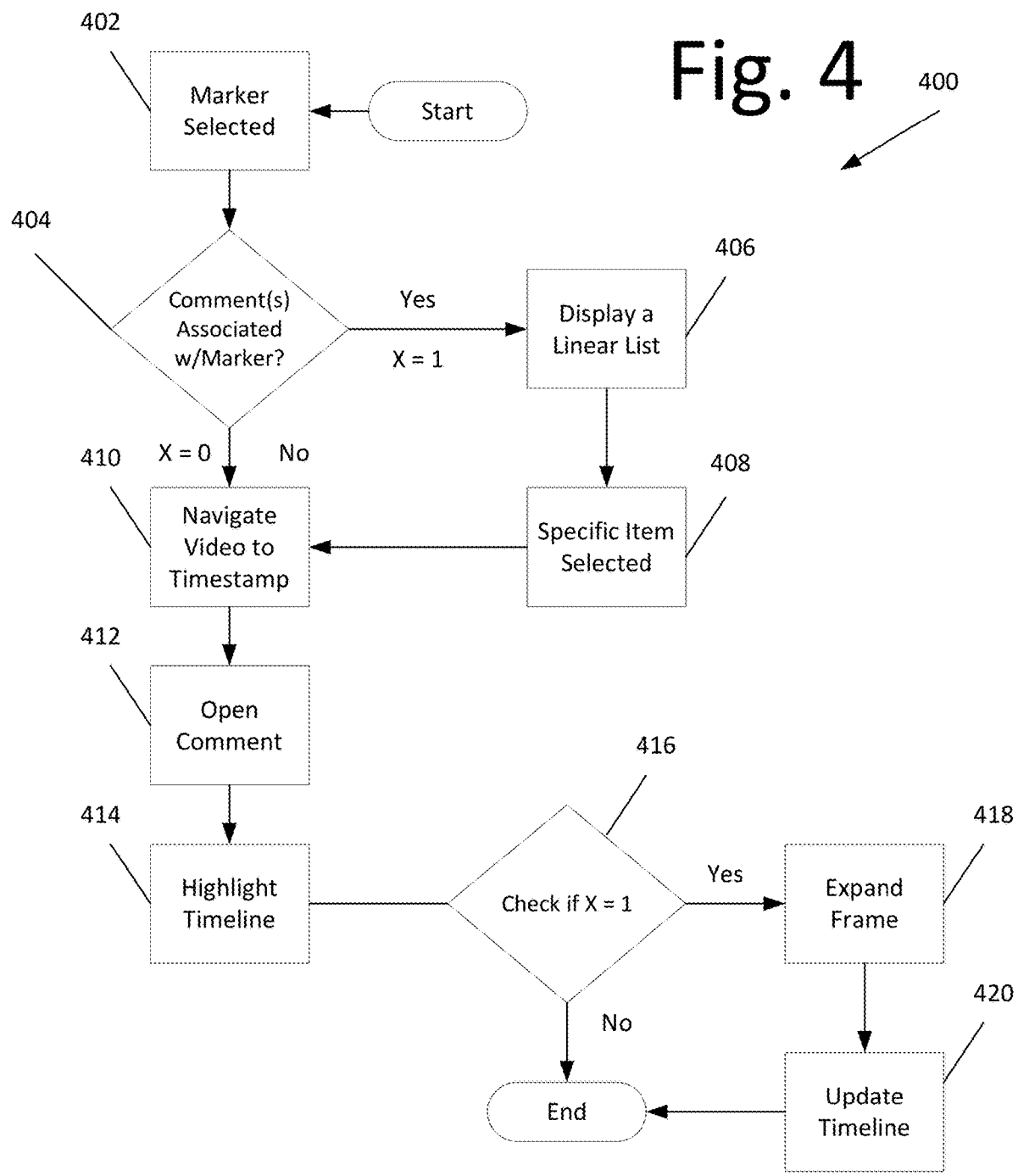

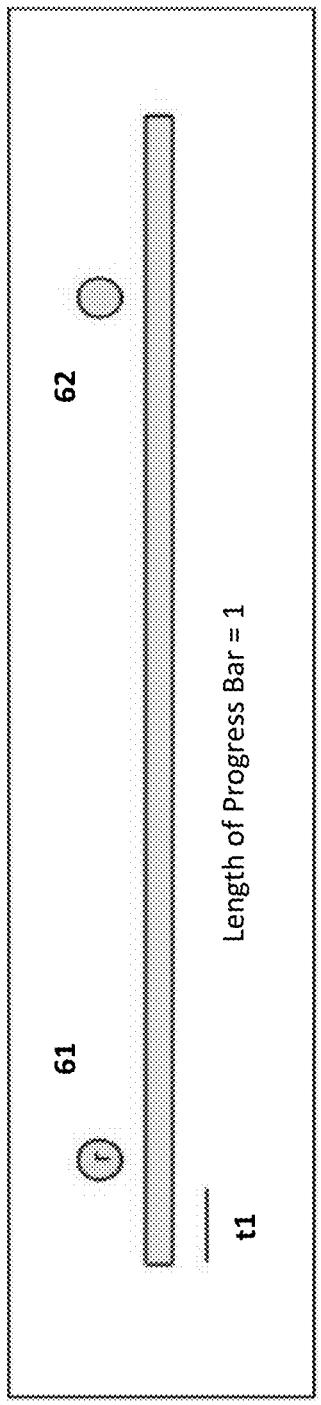

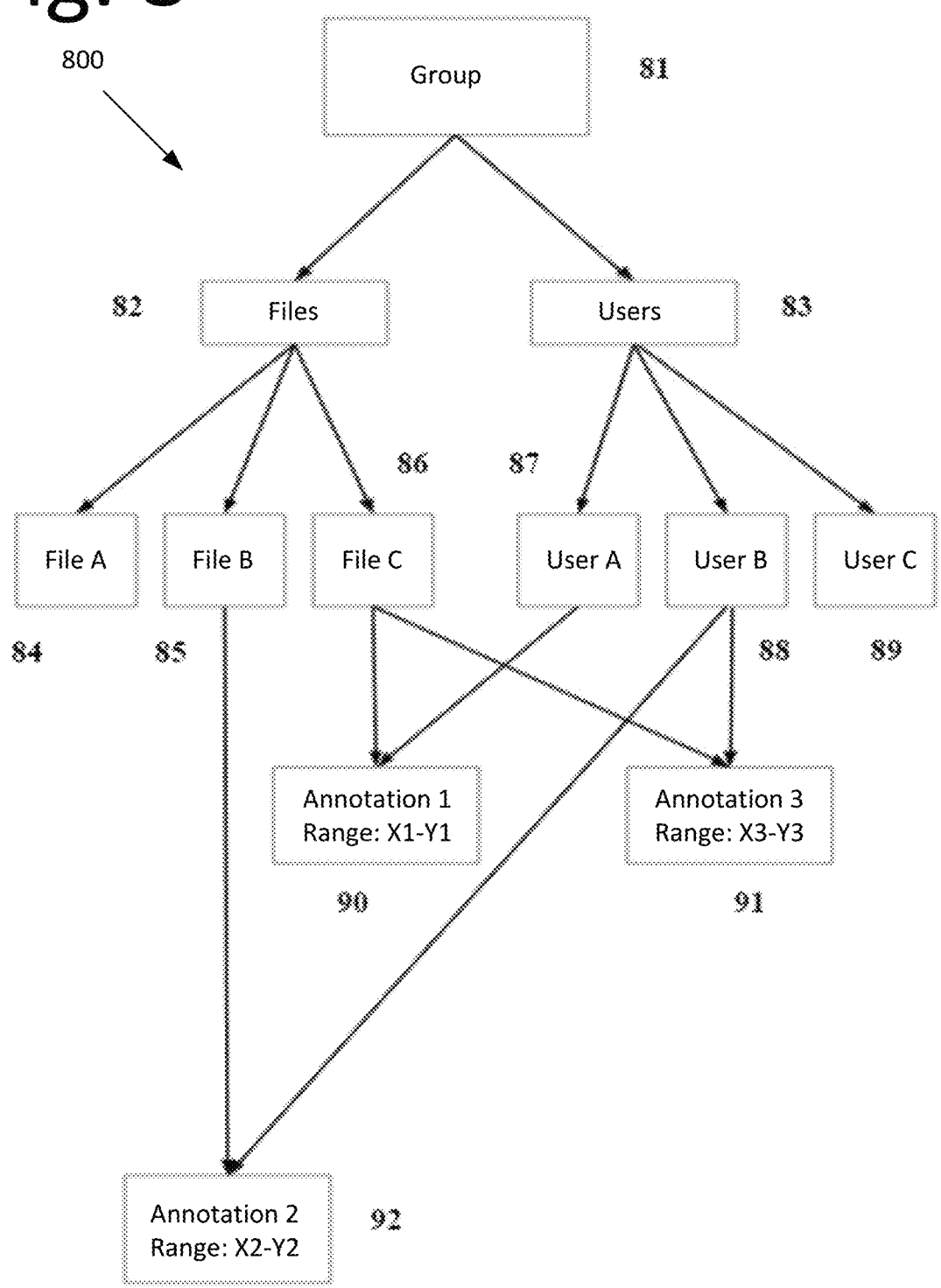

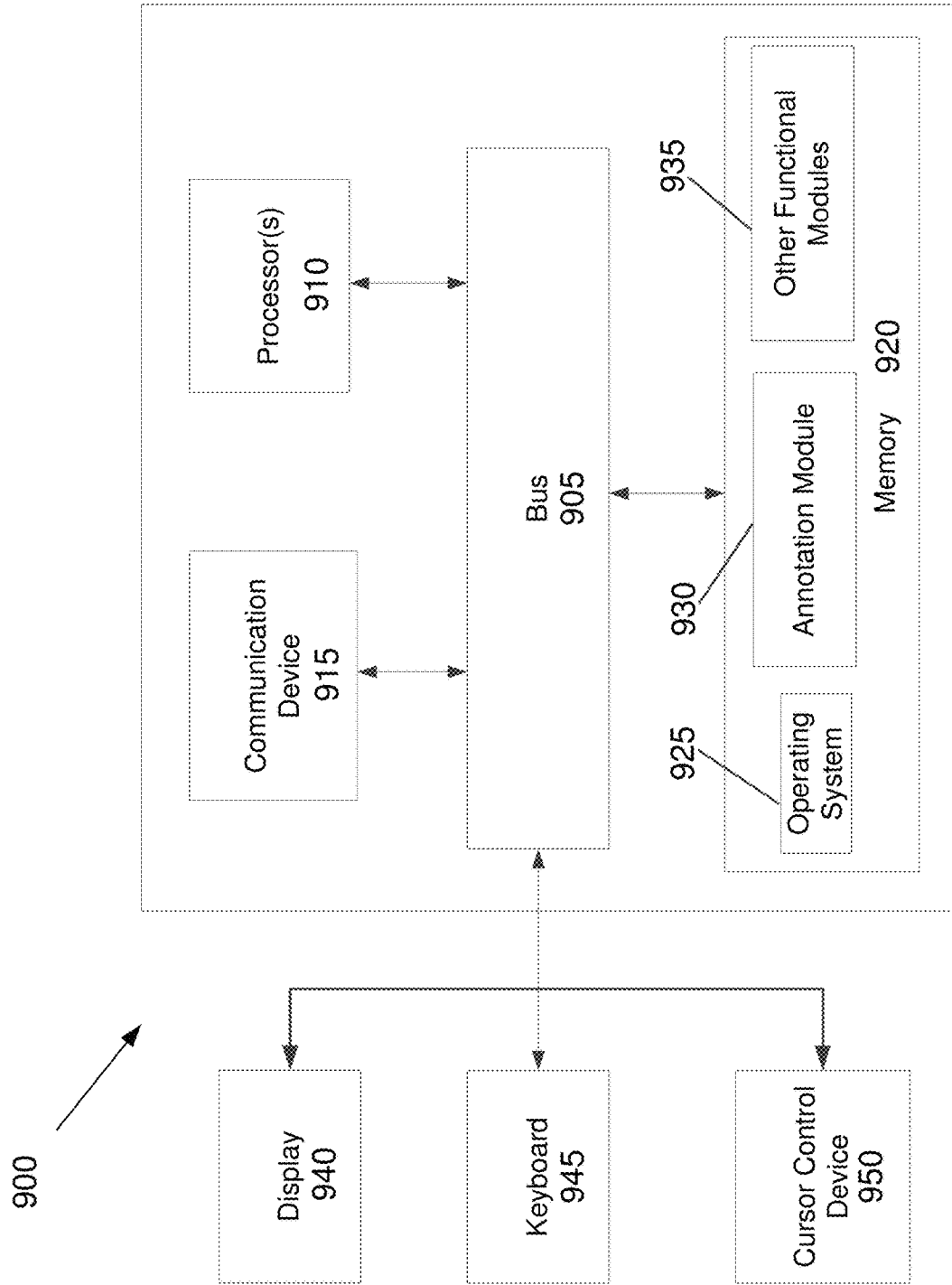

COLLABORATIVELY ANNOTATING STREAMING VIDEOS ON MOBILE DEVICES

CROSS-REFERENCE TO RELATED APPLICATION

This application is a continuation in part of, and claims the benefit of, U.S. application Ser. No. 15/309,384, filed on Nov. 7, 2016, which claims priority to International Application PCT/IN2015/000211, filed on May 18, 2015, which claims the benefit of U.S. Provisional Application No. 62/000,016, filed on May 19, 2014. The subject matter thereof is hereby incorporated herein by reference in its entirety.

FIELD

The present invention relates to a video annotation system, and more particularly, to a collaborative, mobile-based model, for annotating videos over one or more frames.

BACKGROUND

Streaming videos is a ubiquitous part of the World Wide Web today for end users. The ability to view content necessitates annotation of the content with contextual markers to enable asynchronous collaboration across groups of users. Several domains exhibit the need for annotations for collaborative use such as education and research. With the growing proliferation of mobile devices, including smart phones and tablets, and with increasingly touch-based interfaces, the real estate on mobile device screens is limited. For example, Google® has an annotation system for YouTube®. However, with this annotation system the video has very limited space on the mobile device screen. Further, with this annotation system, most of the space is occupied by the annotation timeline or the markup tools. Usability is increasingly important with mobile devices, and applications that are ultimately considered to have any longevity, utilize this as a key benchmark.

Most video annotation applications for mobile devices fail to address the usability issues, and more specifically, fail to address the annotation of one or more frames in a collaborative environment. For example, Coach Eye™ by Techsmith Corp.™ is meant for sport coaches to review the performance of athletes and sportsmen via recorded sessions. Coach Eye™ allows users to draw on top of the video using a set of drawing tools, though these tools are not associated with any range of frames and overlay the entire video. Coach Eye™ further allows users to export these videos with annotations burnt in along with the user's voice, and share these videos with other users in other video formats. Coach Eye™ implements a flywheel pattern, allowing the users to advance through the video with frame accurate precision. This pattern may work well for short videos, but struggles with longer videos.

The above applications fail to address the usability issue with respect to mobile devices and address the collaborative, mobile-based model, for annotating videos over one or more frames.

Thus, an alternative process for providing a collaborative, mobile-based model may be beneficial.

SUMMARY

Certain embodiments of the present invention may provide solutions to the problems and needs in the art that have not yet been fully identified, appreciated, or solved by current video annotating applications. For example, some embodiments, generally discusses a process for providing a collaborative, mobile-based model, for annotating one or more frames in a video.

In an embodiment, a process may include creating one or more markers, allowing a user of a mobile device to annotate the streaming video while one or more users within a group of users are annotating the streaming video in real-time. The process may include receiving a selection from the user for a frame or a range of frame which the user seeks to annotate within the streaming video. The process further includes displaying a text box for the frame or the range of frames for the user to annotate, and receiving a submitted text box from the user and propagating the annotations within the submitted text box to the one or more users within the group.

In another embodiment, a computer-implemented process for viewing one or more annotations on a mobile device includes receiving a marker selection, when a user selects a marker on a timeline of a streaming video. The computer-implemented process includes displaying a list of one or more comments within a vicinity of the selected marker. The computer-implemented process also includes navigating to a timestamp associated where the comment is associated with the streaming video, and displaying the comment from the list of the one or more comments, when the user selects the comment.

In yet another embodiment, a system for interactively annotating among a plurality of users includes an application server in communication with a first group of users and a second group of users. The application server may permit one or more users in the first group, one or more users in the second group, or both, to concurrently or sequentially annotate one or more streaming videos in real-time. The application server may receive one or more annotations for the one or more streaming videos from the one or more users in the first group, the one or more users in the second group, or both. The application server may further concurrently or sequentially store the one or more annotations in a database and transmit the one or more annotations to a streaming server, allowing other users in the first group, other users in the second group, or both, to view the one or more annotations in real-time.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1 is a flow diagram illustrating a process for creating a contextual comment on one or more frames, according to an embodiment of the present invention.

FIGS. 2A-2H are graphical user interfaces (GUIs) illustrating the creation of annotation (or comments) on a screen of a mobile device, according to an embodiment of the present invention.

FIG. 3 is a flow diagram illustrating a process for creating one or more markers on the timeline, according to an embodiment of the present invention.

FIG. 4 is a flow diagram illustrating a process for viewing one or more comments via markers on the timeline, according to an embodiment of the present invention.

FIG. 6 is a GUI illustrating a portion of screen, where one or more comments lie within seconds and are detected by circular markers, according to an embodiment of the present invention.

FIG. 8 is a diagram illustrating a hierarchy of users, files, and annotations within a group, according to an embodiment of the present invention.

FIG. 9 is a block diagram illustrating a computing system for creating the contextual comment on one or more frames, according to an embodiment of the present invention.

DETAILED DESCRIPTION OF THE EMBODIMENTS

Figure 2A:
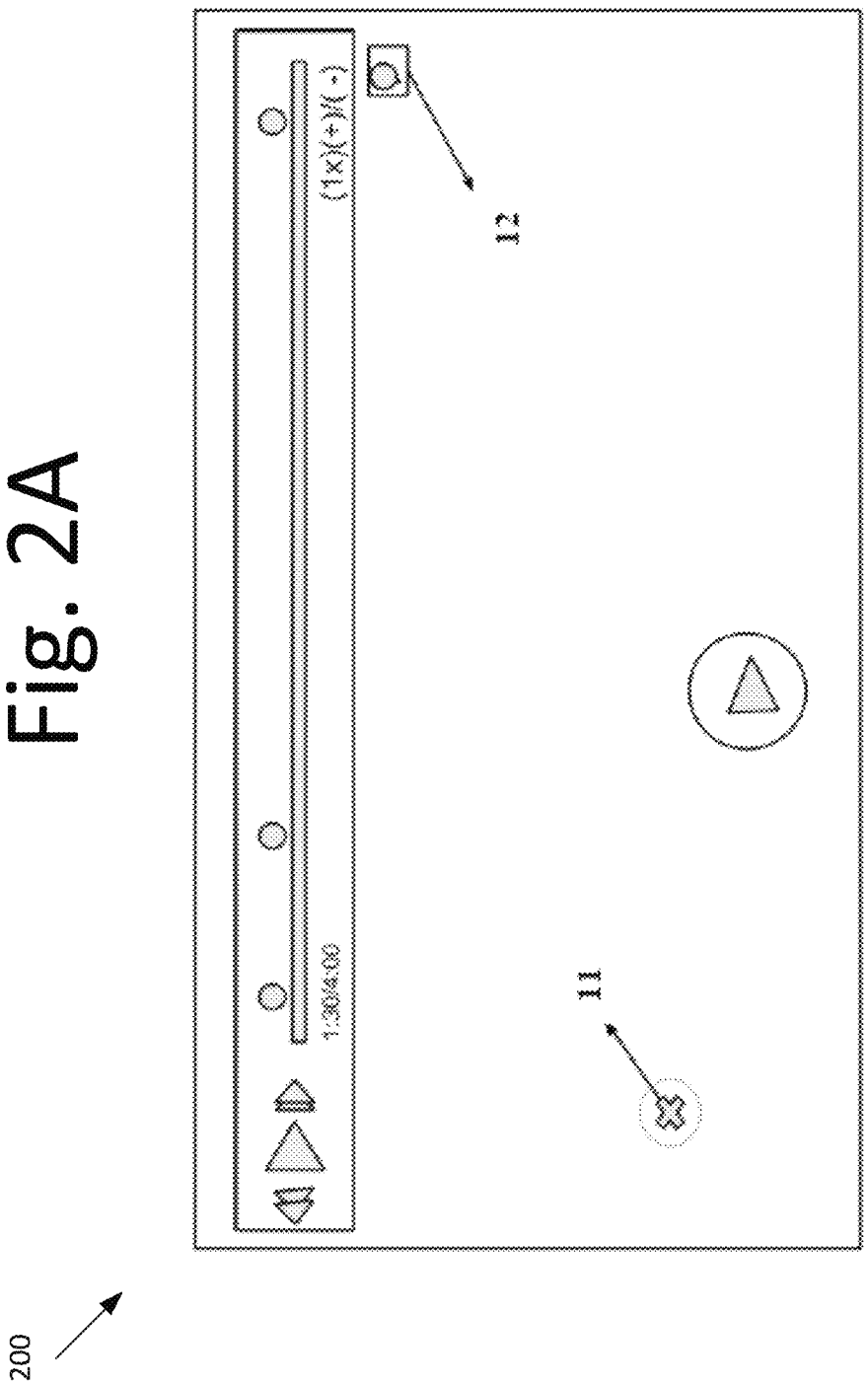

Some embodiments generally pertain to a collaborative, mobile-based model, for annotating one or more frames in a video. For example, certain embodiments provide fine-grained, contextual annotations of streaming videos by one or more users, prioritizing the use of screen space on mobile devices. Annotations may be text based, free hand, or any other form that may be appreciated by a person of ordinary skill in the art. For instance, free hand annotations may include annotations made by the user using his or her finger. This may include words, letters, symbols, drawings, or any other form of annotations. In certain embodiments, annotations allow the one or more users to draw or place threaded comments while using a touch-based interface, reducing distractions caused by a cluttered interface.

By enabling the user to control annotations starting at a particular timestamp within the streaming video, screen real estate is optimized on the mobile device in a more efficient manner. Context commenting may allow for highlighting of one or more parts of the video, which is being annotated, while dimming out the remaining elements on the screen. This permits flexible extensions of a user's comments across one or more frames of the streaming video. With a touch-based interface, the user may select the vicinity around which he or she wishes to increase the sensitivity or have finer control.

In certain embodiments, users are organized at different hierarchies and groups, and may collaboratively annotate the same video. For example, comments by more than one user may be displayed as a list to avoid overlapping comments. Further, a user may approve the finality of his or her comments, and may retain a proactive approach that works with the elements of the touch-based interface.

Most video players provide a generic linear timeline for a video, and a seek bar may be provided by default. Let's assume, for example, that the user is reviewing a 5-minute clip, and the length of the seek bar in this example is 400 pixels. This may translate to 300 seconds of content or 300 seconds×24 frames (assuming the video is 24 fps) being represented as 400 pixels. In other words, (300×24)/400 or 18 frames are represented by every pixel.

With a generic linear timeline, the user may have difficulties when trying to seek (or find) the exact frame he or she wants to comment. Contrary to this, assume that the timeline is designed at the frame accurate granularity. In that case, seeking for the purposes of annotation for a large number of frames becomes rather tedious as the length of the video increases. Thus, there is a need to dynamically adjust the timeline sensing to reflect the user's desire.

In certain embodiment, a process for fine-grained, contextual annotation of a streaming video by one or more users may be provided, optimizing the use of screen space available on the mobile device. In these embodiments, the one or more users may represent annotations on the video's timeline by creating one or more markers. The one or more users may physically press down on the screen of the mobile device to select the vicinity in the video over which he or she seeks finer control on playback or reduced sensitivity. The one or more users may approve the annotations by selecting the submit button. This results in displaying a crisp, list-based view of the collaborative annotations at the same point within the video's timeline.

In addition to creating markers, comments and metadata may also be created. For example, the user may pause the video at a particular timestamp, and select the comment tool. By selecting the comment tool, the application may switch to a comment mode. In the comment mode, the user may enter his or her comment in the comment box and extend his or her comment to a larger range of frames than the original selection. This may be accomplished by a dragging action with a single finger, for example.

The desired finer control on playback or reduced sensitivity may be achieved in certain embodiments. For example, the user may select the vicinity within the video by zooming into particular portions of the video's timeline, and may move forward and backward in time by a small realizable movement of the cursor on the timeline.

The user may approve his or her annotation after the system has checked for the existence of prior annotations that lie within a specific interval of that timestamp. In the event of preexisting comments, the system may add the comment associated with this instance of the annotation to a list associated with the nearest marker. In the event of no preexisting comments, a new marker is created with a unique user image for the user that has added the comment.

The user may also view collaborative annotations at the same point within the video's timeline following one or more steps. For example, the user may tap on a marker on the video's timeline, the marker denoting one or more comments. In the event of a marker denoting a single comment, the system may navigate to the beginning of the range of frames with which the comment is associated. The system may then expand the comment, allowing the user to view the contents over one or more frames. In the event of a marker denoting more than one comment, the system may provide the user with a linear list of comments within that group. Auxiliary comments on that frame and other frames in the vicinity may also be provided. The system may accept the user's choice for the comment he or she selects and displays the details accordingly.

FIG. 1 is a flow diagram illustrating a process 100 for creating contextual comment on one or more frames, according to an embodiment of the present invention. In some embodiments, process 100 begins at 102 with a user selecting a comment tool in a video player. At 104, the user performs a long tap (or touch) on top of the video. For purposes of simplicity, long tap or touch will be referred to as "touch". See, for example, FIG. 2A, which is a GUI illustrating a user touching a screen 200 at a point where he or she can drop a comment, according to an embodiment of the present invention.

In FIG. 2A, when a user touches an area of interest on screen 200 as the video is playing, a comment tool 12 may pop up shortly thereafter. In this example, a user selects comment tool 12, when he or she wants to leave an annotation. The user may then touch the screen to make an impression at a particular point (also known as the "area of interest") 11 on the screen.

Returning to FIG. 1, once the user touches the screen, coordinates (e.g., x- and y-coordinates) of the touch are captured and a marker is shown at that point at 106. The coordinates are then sent to a central server in certain embodiments. Concurrently, at 108, a text box is displayed on the screen, allowing the user to start typing therein. In some embodiments, a color dot may appear on the timeline to indicate where the comment has been created. In certain embodiments, the video player may pause while the user is performing his or her annotations. For example, when the comment tool is selected, the video may automatically pause to allow the user to perform his or her annotations.

Figure 2B:
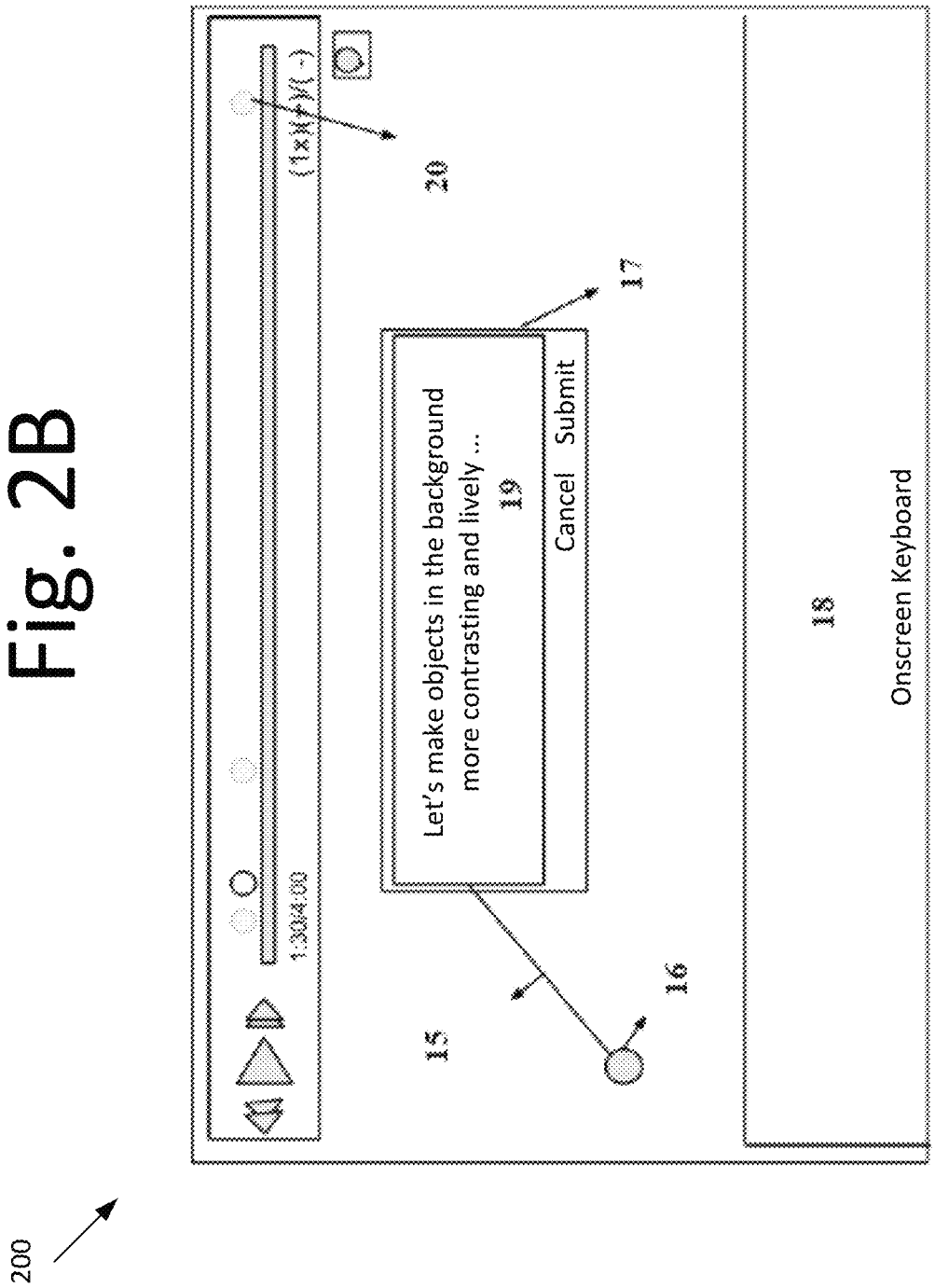

For example, FIG. 2B is a GUI illustrating a screen 200 displaying a comment box 19, according to an embodiment of the present invention. In this embodiment, when the user touches screen 200, an impression 16 is created and a comment box 19 appears on screen 200. Comment box 19 is connected to impression 16 via line 15 in this embodiment. This shows the user that comment box 19 is associated with impression 16, otherwise known as the area of interest. Below comment box 19 is an onscreen keyboard 18, which allows the user to type his or her comments therein. Any previous comments associated with or near the impression may be dimmed, and the focus may be on active timeline marker 20.

Returning to FIG. 1, although an annotation may be for a specific frame, an annotation may be for a specific range of frames. For example, because a video may have 24 fps, certain embodiments may allow a single annotation to be associated with multiple frames. For this reason, at 108, a check is performed to determine if the user has associated his or her comment with more than one frame (e.g., a range of frames). This may be done one of several ways. For example, if the user selects the submit button (shown in FIG. 2B) without selecting a range of frames, process 100 may determine that the user has commented on a single frame and then proceeds to step 116. Otherwise, process 100 may continue to step 112 knowing that the user would like to select a range of frames.

Figure 2C:
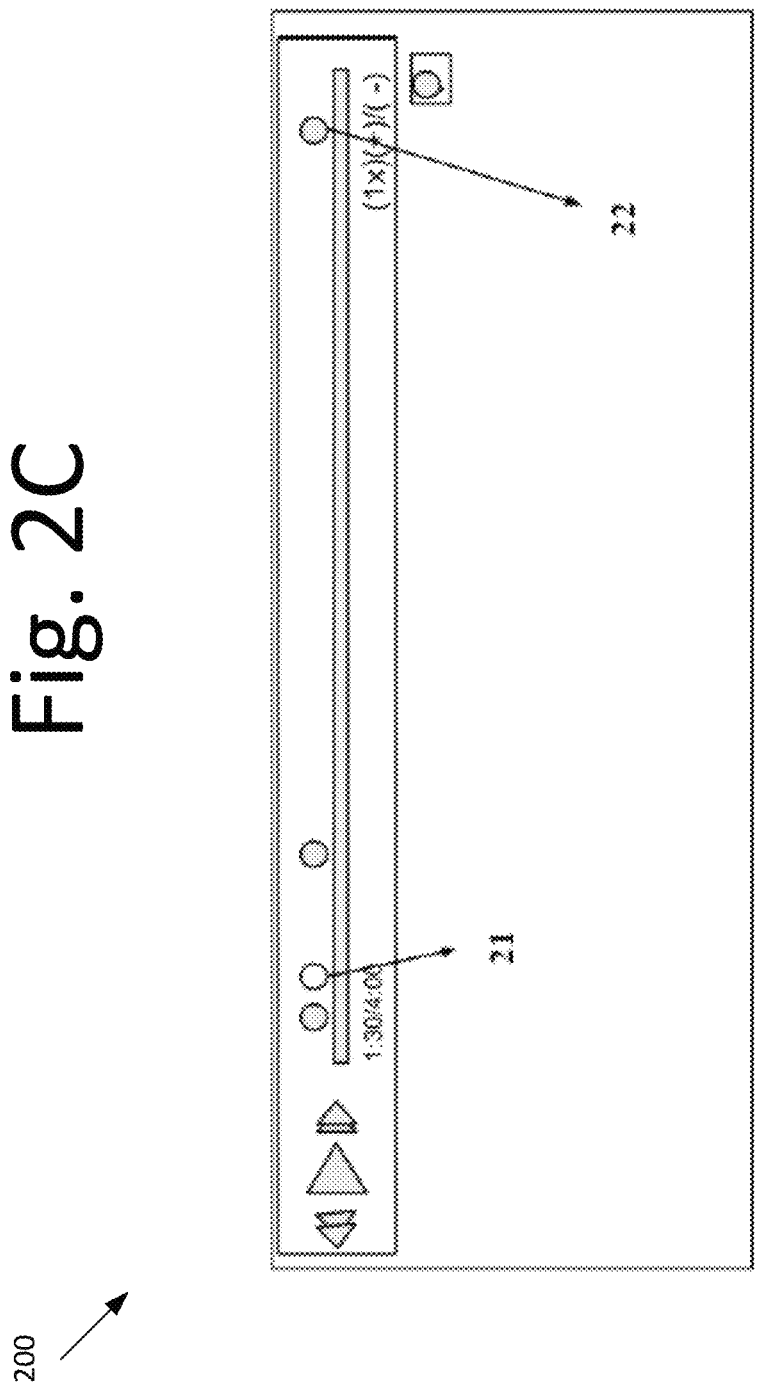

At 112, the user touches and drags a marker, which is above the seek bar in some embodiments, over the various range of frames to associate the range of frames with the comment. For example, in FIG. 2C, screen 200 shows a state of a video timeline while the user is inputting his or her comment, according to an embodiment of the present invention. In this embodiment, a marker 21 and previous comments 22 may appear above the seek bar. Previous comments 22 allows the user to select and view any previous comments. Marker 21 may allow the user to drag marker 21 such that two markers are created above the seek bar. See, for example, FIG. 2D, which is a GUI illustrating a screen 200 extending a contextual comment over one or more frames in the video, according to an embodiment of the present invention.

Figure 2D:
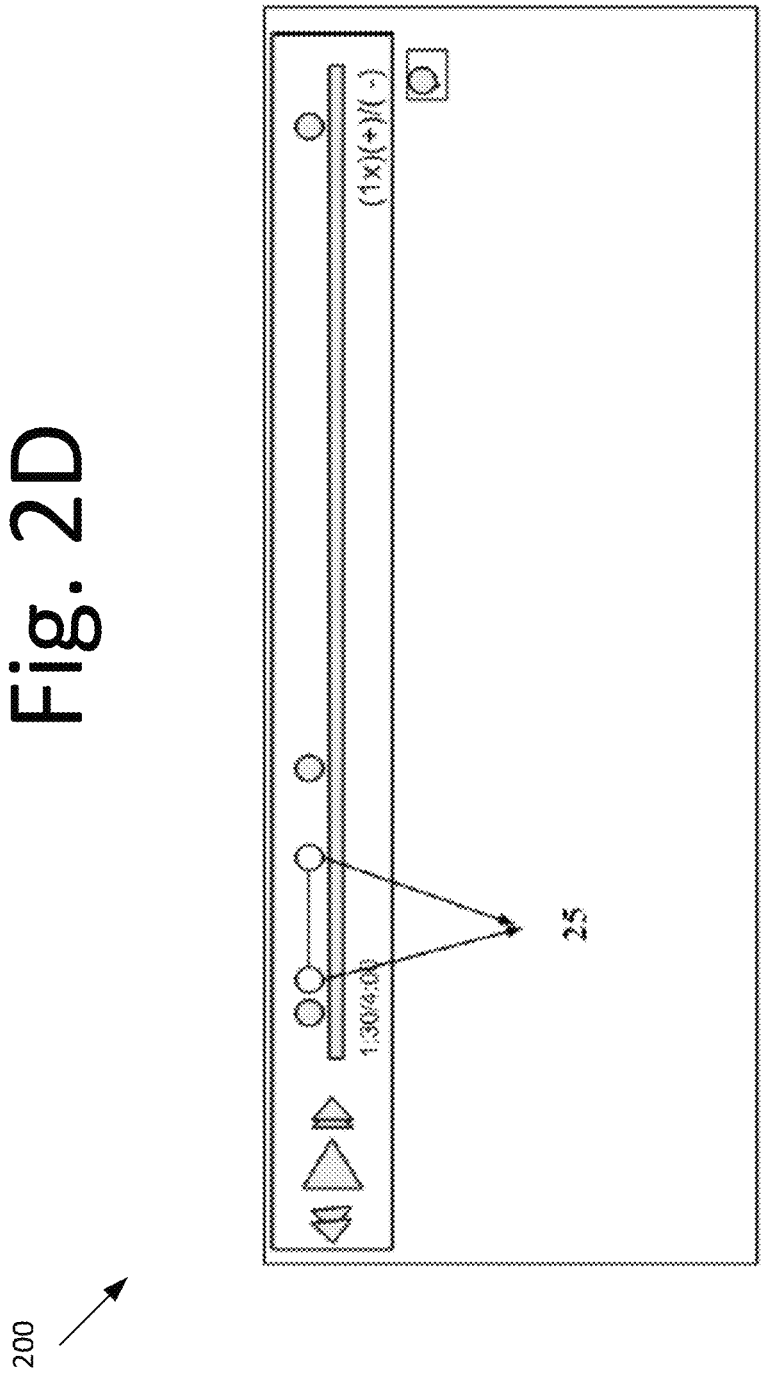

In FIG. 2D, the dragging action performed by the user creates two points 25 showing the range of frames that were selected by the user. While the user adjusts the markers, the user may touch any point therebetween. This may cause the video to seek to the time represented in the timeline or to the point where the marks have been adjusted. The adjustment of the markers may further allow the user to view the range of frames that are to be annotated.

Returning to FIG. 1, at 114, the user presses the markers shown on the screen, causing the timeline to expand and show various frames of the video. For example, this may be similar to zooming into the video on the seek bar and display a filmstrip over which the user can more finely adjust his or her selection. See, for example, FIGS. 2E-2F, which illustrate a screen 200 displaying a range of frames expanded from the timeline, according to an embodiment of the present invention.

Figure 2F:
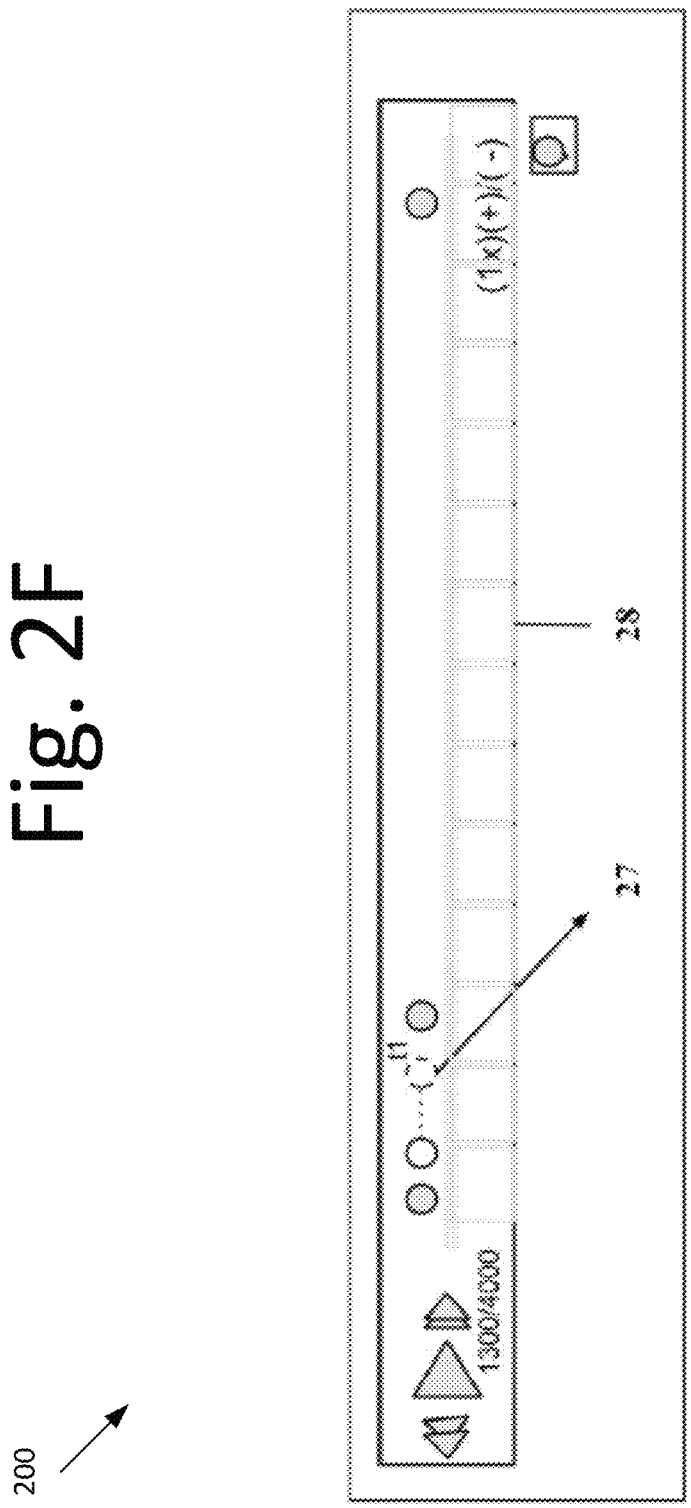
Figure 2G:
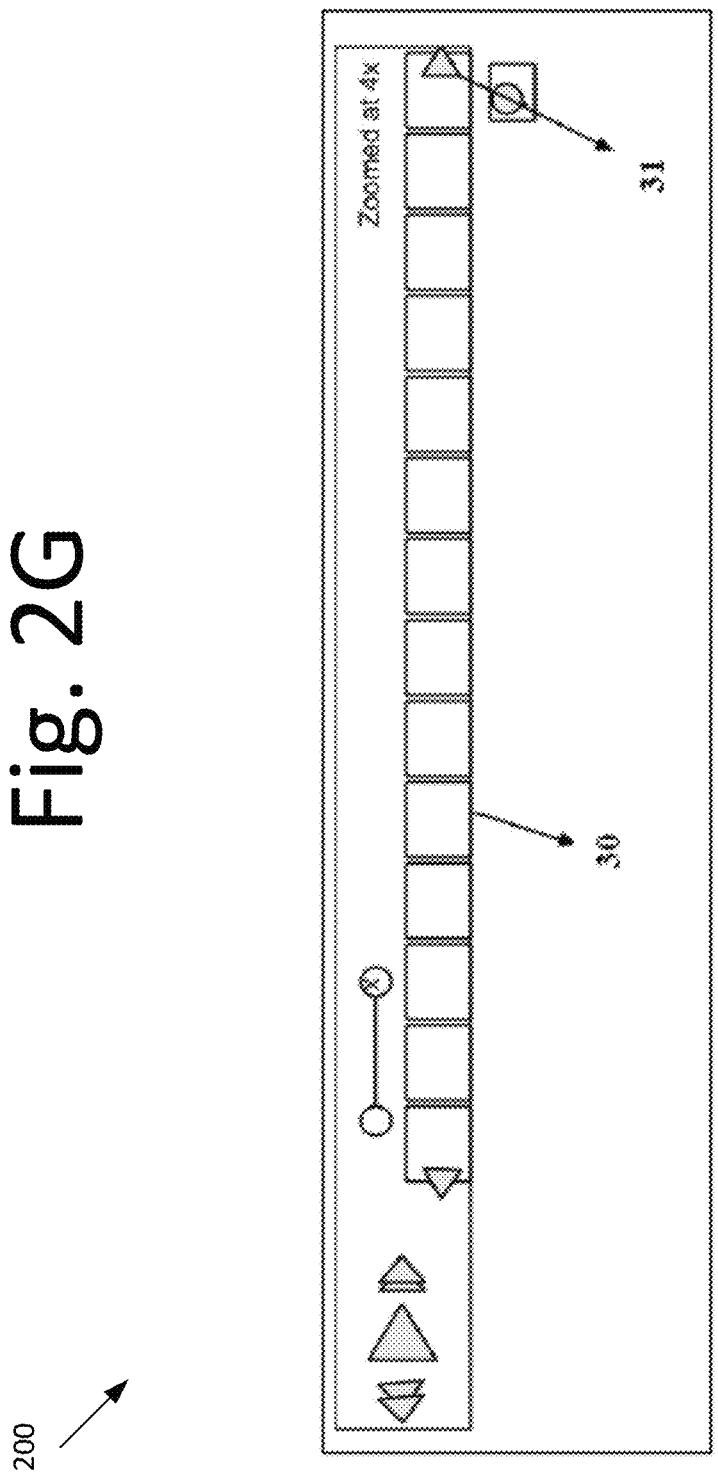

In FIG. 2E, for example, screen 200 shows that the user is actively adjusting the range of frames for purposes of annotation. This may be accomplished by dragging marker 26 on the timeline to a point t1. In FIG. 2F, screen 200 shows video frames 28 resulting from the user hard pressing marker 27 to finetune his or her selection. For example, the hard pressing causes the linear timeline to fade away and a series of video frames 28 to fade in. This provides the user with more control for the purposes of seeking or traversing through the selected range of frames. FIG. 2G, for example, shows a screen 200 showing video frames 30. By showing video frames 30, the user can scroll through video frames 30 and make smaller adjustments that would otherwise not be readily available on the mobile device. Since video frames 30 may not fit within display of the mobile device, the user may scroll through video frames 30 using arrows 31.

Returning to FIG. 1, when the user is satisfied with his or her selection, the user presses the submit button (FIG. 2B) at 116. Once the submit button is pressed, the final form of the saved comment appearing on the screen is displayed, and at 118, a color dot (not shown) on the timeline turns into a user image at the frame. In other embodiments, the user image may be at the start of the range of frames. In either case, a comment appears on the screen in a final submitted form. Further, the image identifies the location of the comment in relation to the timeline, and identifies the user who submitted the comment. This way, other users at various locations viewing the comment may know who created the comment and where the comment is located.

For example, FIG. 2H shows a screen 200 displaying a final form of the saved comment 36, according to an embodiment of the present invention. In this embodiment, comment 36 is shown on screen 200 and an image 35 of the user who submitted comment 36 is also shown. If the user taps on image 35, comment 36, including the associated with image 35, may collapse.

At 120, data associated with the comments are sent to the server and saved for future use. The data may include coordinates, frame number(s), range of frames, annotations/comment(s), etc.

FIG. 3 is a flow diagram illustrating a process 300 for creating one or more markers on the timeline, according to an embodiment of the present invention. Process 800 begins with the user submitting a comment to the server at 302. At 304, the process determines if any previous annotation is within a specific interval at a particular time stamp. If a previous annotation is within a specific interval, the new comment is added to the list of annotations associated with the nearest marker at 306. Concurrently, at 308, a marker begins to flash or blink identifying where the comment was added and the user image for the most recent comment is updated. If, however, a previous annotation is not within a specific interval, a new marker is created at 310, and a user image for the user that added the comment is displayed at 312.

FIG. 4 is a flow diagram illustrating a process 400 for viewing one or more comments via markers on the timeline, according to an embodiment of the present invention. Process 400 may begin at 402 when the user selects a marker on the timeline. Depending on the embodiment, the user may perform a long tap or a shot tap on the marker. At 404, a determination is made as to whether more than one comment is associated with the selected marker. If more than one comment is associated with the selected marker, then at 406, the user is presented with a linear list of comments within that group, i.e., the comment associated with the frame, including any frames within the vicinity of the comment.

Figure 5A:
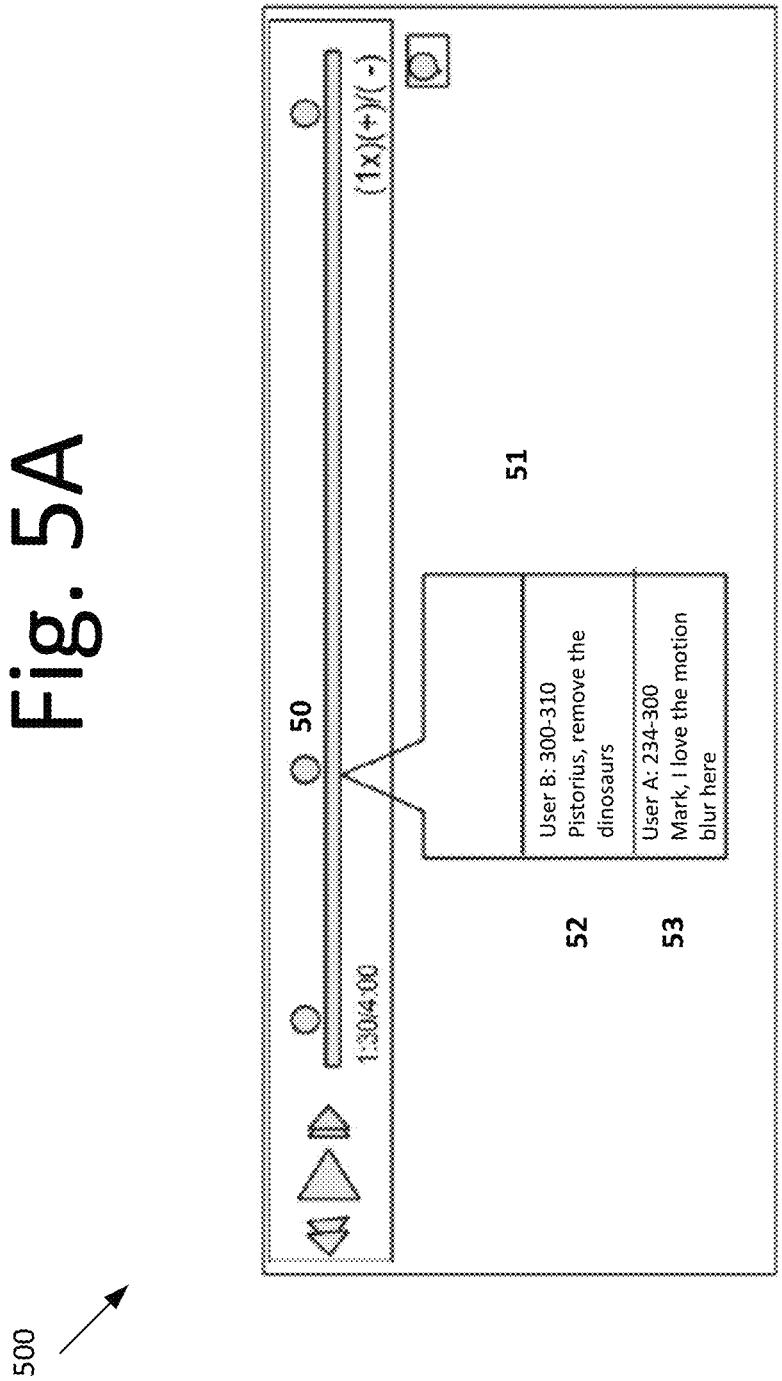
FIGS. 5A and 5B are GUIs illustrating a screen displaying one or more comments, according to an embodiment of the present invention.

FIG. 5A is a GUI illustrating a screen 500 displaying a linear list 51 of comments at a selected marker 50, according to an embodiment of the present invention. Although a linear list is shown in FIG. 5A, the embodiments shown in FIG. 5A are not limited to a linear list, and may be arranged in any manner. Comments may be within the group on one or more frames in the vicinity. In this example, linear list 51 includes two annotations 52 and 53, both of which include user information, the range of frames, the coordinates, the annotation (or comment).

Figure 5B:
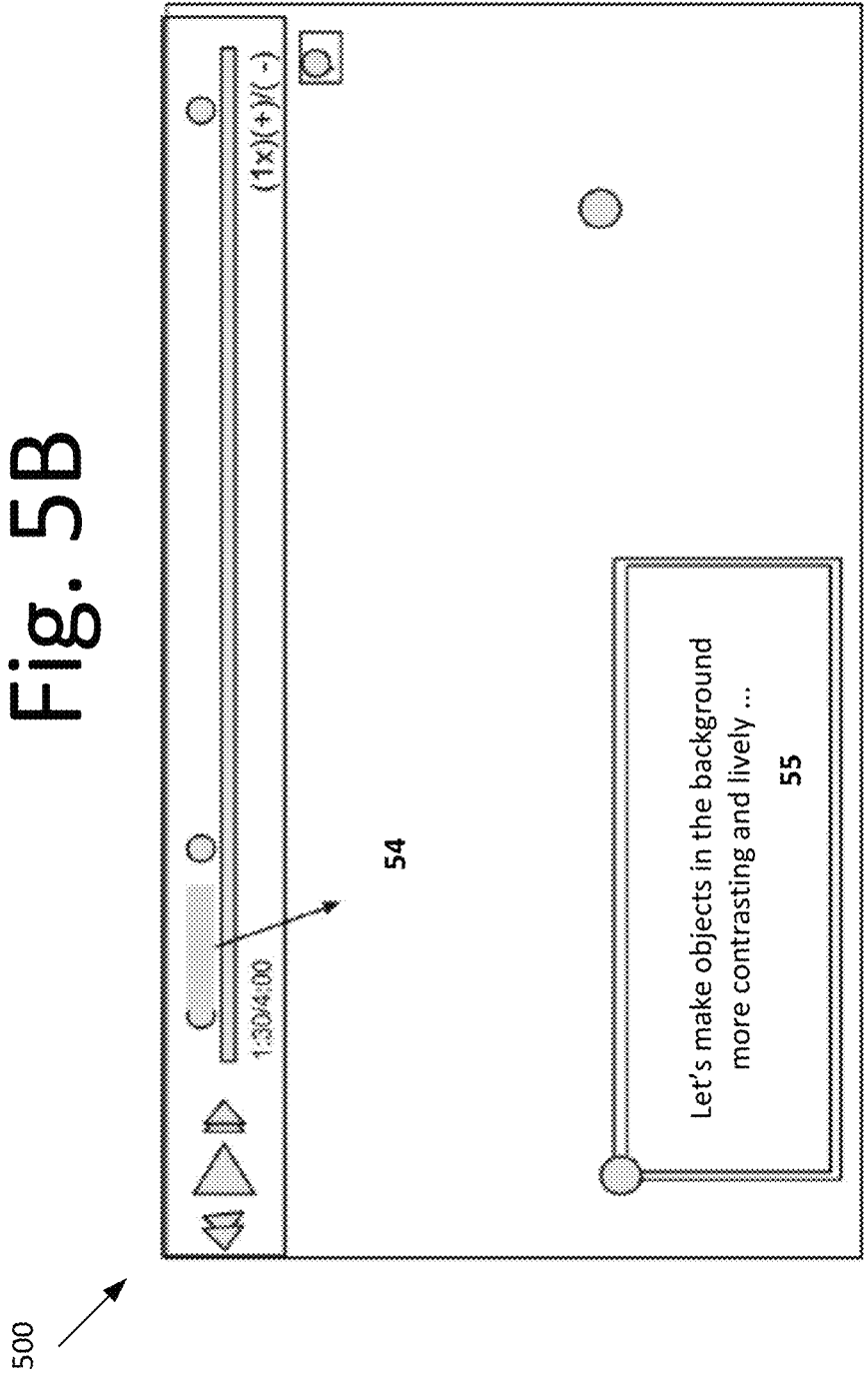

Returning to FIG. 4, at 408, a specific list item is clicked by the user, for which he or she would like to see more detail. At 410, the user may navigate to a timestamp where the comment is associated with the video. At 412, the comment opens the specified frame in an expanded state, and at 414, the timeline for the range of frames is highlighted. See, for example, FIG. 5B. In this embodiment, screen 500 shows the annotation 55 that was made over the highlighted range of frames 54. This allows the user to know which frames were annotated, and play only through the annotated part of the video.

Returning to FIG. 4, at 416 a determination is made to check if more than one comment (X=1) is associated with marker for the particular frame or range of frames. If not, then the process ends. Otherwise, the process continues to 418. At 418, another comment expands when the user taps on the other comment within the same frame. At 420, the timeline is then updated to reflect the newer range of frames the comment represents. Although not shown, the process may revert to 410 in some embodiments.

FIG. 6 is a GUI illustrating a portion of screen 600, where one or more comments lie within seconds and are detected by circular markers 61, 62, according to an embodiment of the present invention. In this embodiment, any comment that lies within (2×r+t)/l is detected for circular markers, where 'r' is the radius of the circle, 't' is the time of the comment marker, and 'l' is the length the timeline currently in the same dimension.

Figure 7:
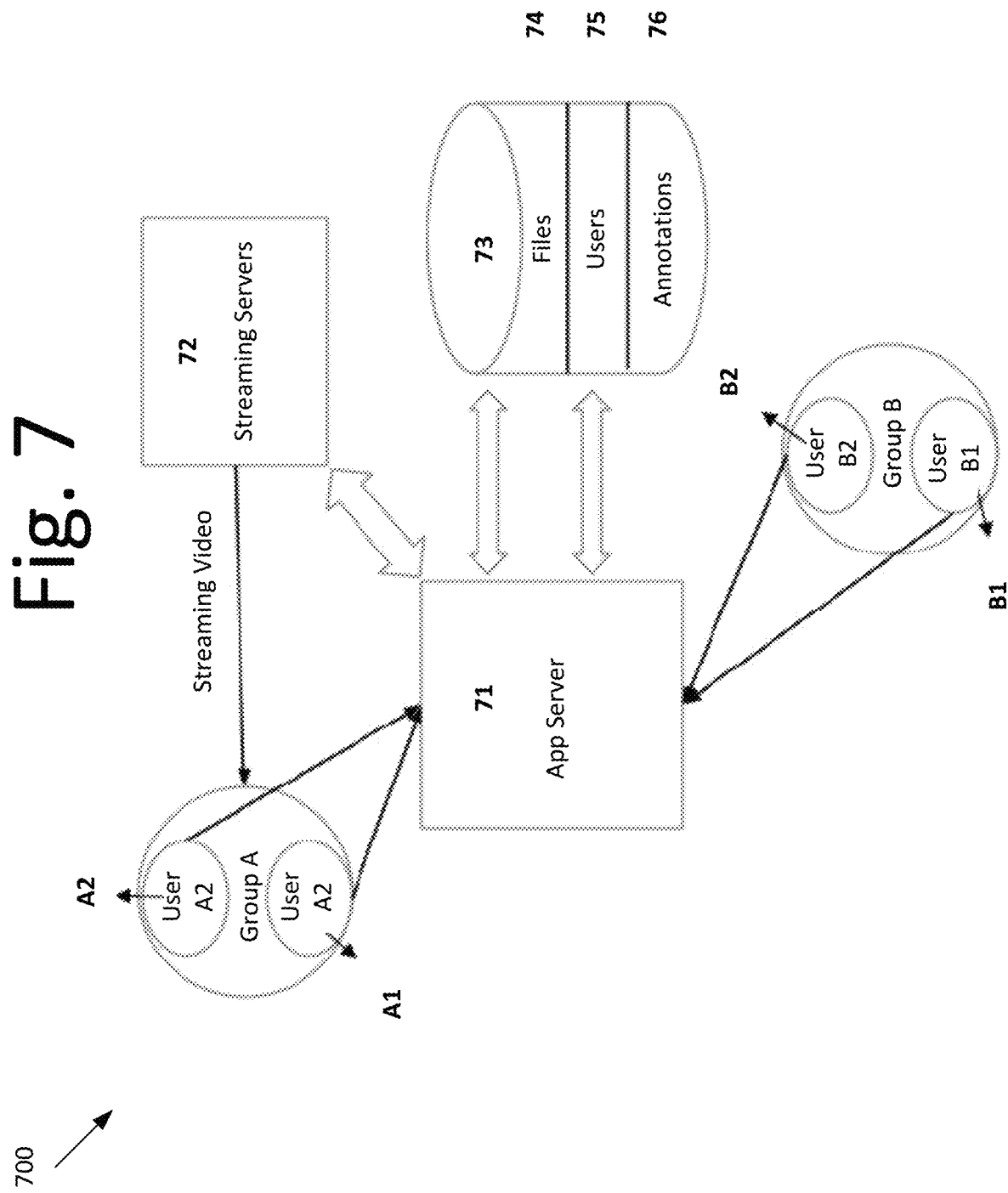
FIG. 7 is a diagram illustrating a system for interactively annotating among one or more users and/or groups, according to an embodiment of the present invention.

FIG. 7 is a diagram illustrating a system 700 for interactively annotating among one or more users and/or groups, according to an embodiment of the present invention. In some embodiments, the system may include an application (or app) server 71, one or more streaming servers 72, and a database 73. App server 71 may be connected to one or more streaming servers 72 and database 73. Database 73 may include, but is not limited to, files 74, user information 75, and one or more annotations 76.

In certain embodiments, app server 71 may receive information from at least two groups—Group A and Group B. Group A includes one or more users, and Group B includes one or more users. In this example, user A1 and user A2 are part of group A and user B1 and user B2 are part of group B. When app server 71 receives information, app server 71 may store the information related to the annotation within database 73. Concurrently, the annotations, which are received by app server 71, are sent to one or more streaming servers 72. By transmitting the annotations to one or more streaming servers 72, other users within the group can view the annotations in real-time. For example, if user A1 makes an annotation, the annotation is not only stored in database 73 but also instantaneously viewed by user A2. This may apply to any changes to the video.

In another example, user A1 and user A2 may concurrently annotate the video. These annotations may be received by application server 71, and concurrently stored in database 73 and transmitted to streaming servers 72. This way, user A1 and user A2 may view in real-time annotations by the other user. In other words, embodiments described herein allow for a group of users to work (or collaborate) together while annotating the video.

Although FIG. 7 shows that one or more streaming servers 72 streams videos to the users within Group A, one or more streaming server 72 may also stream videos to the users within Group B. It should be further appreciated that any annotation within any of the groups may be viewed by other members of the group in real-time. This increases the speed at which annotations are communicated to the other users within the group.

FIG. 8 is a diagram illustrating 800 a hierarchy of users, files, and annotations within a group, according to an embodiment of the present invention. In this embodiment, hierarchy 800 includes a group 81 and various nodes branch from group 81. This may include files 82 and users 83. Under files 82, various nodes, i.e., files 84 . . . 86, may branch out, and from users 83, various nodes, i.e., users 87 . . . 89, etc. may branch out.

This diagram 800 essentially shows that various users 87 . . . 89 may collaborate on one or more files 84 . . . 86, and various users 87 . . . 89 may view and make any changes on one or more files 84 . . . 86 in real time. For example, different users and file details may form one or more types of Annotations, such as Annotation 1, Annotation 2, and Annotation 3. Each annotation may include a range such as X1-Y1, X2-Y2, X3-Y3, etc. These ranges are frames on which the annotation has been created and may be visible while viewing. For example, user A may annotate frame A and user B may annotate frame B of File A. If an annotation is saved by user A, user B may receive a notification for a change of view (from frame B to frame A). User B may then choose to view frame A or stay on frame B. User B may also make further annotations to either frame A, which was annotated by user A, or continue to annotate frame B.

FIG. 9 is a block diagram illustrating a computing system 900 for creating the contextual comment on one or more frames, according to an embodiment of the present invention. FIG. 9 illustrates a block diagram of a computing system 900, according to one embodiment of the present invention. Computing system 900 may include a bus 905 or other communication mechanism configured to communicate information, and at least one processor 910, coupled to bus 905, configured to process information. At least one processor 910 can be any type of general or specific purpose processor. Computing system 900 may also include memory 920 configured to store information and instructions to be executed by at least one processor 910. Memory 920 can be comprised of any combination of random access memory ("RAM"), read only memory ("ROM"), static storage such as a magnetic or optical disk, or any other type of computer readable medium. Computing system 900 may also include a communication device 915, such as a transceiver, configured to provide access to a network.

The computer readable medium may be any available media that can be accessed by at least one processor 910. The computer readable medium may include both volatile and nonvolatile medium, removable and non-removable media, and communication media. The communication media may include computer readable instructions, data structures, program modules, or other data and may include any information delivery media.

At least one processor 910 can also be coupled via bus 905 to a display 940, such as a Liquid Crystal Display ("LCD") on a mobile device. Display 940 may display information to the user, such as annotations that are made in real time on a mobile device. A keyboard 945 and a cursor control unit 950 may also be coupled to bus 905 to enable the user to interface with computing system 900. Keyboard 945 may be part of display 940, since display 940 may be a haptic device. Cursor control unit 950 may be a person's finger or a stylus, or any device that would be appreciated by a person of ordinary skill in the art.

According to an embodiment, memory 920 may store software modules that may provide functionality when executed by at least one processor 910. The modules can include an operating system 925, such as iOS™ or an Android™ platform, and an annotation module 930, as well as other functional modules 935. Annotation module may execute the processes described in FIGS. 1, 3, and 4. Operating system 925 may provide operating system functionality for computing system 900. Because computing system 900 may be part of a larger system, computing system 900 may include one or more additional functional modules 935 to include the additional functionality.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process shown in FIGS. 1, 8, and 9 may be performed, in part, by a computer program, encoding instructions for a nonlinear adaptive processor to cause at least the process described in FIGS. 1, 8, and 9 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the process described in FIGS. 1, 8, and 9, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Some embodiments may provide a technique for annotating over a range of frames in a video on a mobile device. The technique may use a touch base interface on a video itself. The technique may allow video playback in the mobile device with the annotation layered on top of the video playback. This annotation may be for the range of frames that were selected by the user.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system for interactively annotating among a plurality of users, the system comprising:
   an application server directly in communication with a first group of users and a second group of users, and in direct communication with a streaming server and a database, wherein
   the application server is configured to
      permit one or more users in the first group, one or more users in the second group, or both, to concurrently or sequentially annotate one or more streaming videos in real-time,
      receive one or more annotations for the one or more streaming videos from the one or more users in the first group, the one or more users in the second group, or both, and
      simultaneously store the one or more annotations in the database and transmit a frame associated with one or more annotations to the streaming server, allowing other users in the first group, other users in the second group, or both, to view the frame associated with the one or more annotations in real-time;
   one or more mobile devices connected to the first group; and
   one or more mobile devices connected to the second group, wherein,
   the one or more mobile devices in the first group, the second group, or both are configured to
      facilitate the one or more annotations of the one or more streaming videos in real-time, and
      display a linear list via markers on a timeline when one of the markers is selected on the timeline, the linear list displaying one or more comments of the one or more annotations, user information associated with the one or more annotations, a range of frames associated with the one or more annotations, and coordinates associated with the one or more annotations, and
   the database comprising a plurality of groups, wherein each of the plurality of groups comprise a videos file and user file, the video file comprising the one or more streaming videos branching out from the video file and the user file comprising a plurality of users branching out from the user file, database creating a link between one of the one or more streaming videos and one of the plurality of users that annotated the one of the one or more streaming videos to facilitate collaboration between at least one of the plurality of users on any one of the one or more streaming videos within any one of the plurality of groups at the same time,
   each one of the plurality users and each of the one or more streaming videos form one or more annotations, each of the one or more annotations comprising of a range of frames on which the annotation is created and an annotated frame within the range of frames is visible for viewing by one or more of other users annotating one or more other frames within the range of frames, and
   when a first user annotates a first video frame in a given video stream and a second user annotates a second video frame in the given streaming video, the second user receives a notification for a change of view from the second video frame to the first video frame, allowing the second user to further annotate the first video frame or continue to annotate the second video frame of the given streaming video.

2. The system of claim 1, wherein the one or more annotations comprise one or more text-based comments, one or more finger drawn comments, one or more symbols, one or more images, or any combination thereof.

3. The system of claim 1, wherein the one or more mobile devices in the first group, the one or more mobile devices in the second group, or both, are configured to receive real-time annotations by the other users in the first group, the other users in the second group, or both.

4. The system of claim 1, wherein
   the streaming server is connected to the application server and with the one or more users in the first group, the one or more users in the second group, or both, and
   when the one or more annotations are received from the application server, the streaming server is configured to transmit the one or more annotations in real-time to the one or more users in the first group, the one or more users in the second group, or both.

5. The system of claim 1, wherein each of the one or more streaming videos and each of the plurality of users form one or more types of annotations, each of the one or more types of annotations comprises a range, the range being one or more video frames in a given streaming video on which annotations are created and visible for each of the plurality of users associated therewith, allowing continuous annotations and viewing to the one or more video frames within the one or more streaming videos in real-time.

6. A method for interactively annotating among a plurality of users, the method comprising:
   permitting, by an application server, one or more users in a first group, one or more users in a second group, or both, to concurrently or sequentially annotate one or more streaming videos in real-time;
   receiving, by the application server, one or more annotations for the one or more streaming videos from the one or more users in the first group, the one or more users in the second group, or both;
   simultaneously storing, from the application server, the one or more annotations in a database and transmit a frame associated with the one or more annotations to the streaming server, allowing other users in the first group, other users in the second group, or both, to view the frame associated with the one or more annotations in real-time; and displaying a linear list via markers on a timeline when one of the markers is selected on the timeline, wherein the linear list displaying the one or more comments of the one or more annotations, user information associated with the one or more annotations, a range of frames associated with the one or more annotations, and coordinates associated with the one or more annotations, wherein the database comprising a plurality of groups, wherein each of the plurality of groups comprise a videos file and user file, the video file comprising the one or more streaming videos branching out from the video file and the user file comprising a plurality of users branching out from the user file, the database create a link between one of the one or more streaming videos and one of the plurality of users that annotated the one of the one or more streaming videos to facilitate collaboration between at least one of the plurality of users on any one of the one or more streaming videos within any one of the plurality of groups at the same time, each one of the plurality users and each of the one or more streaming videos form one or more annotations, each of the one or more annotations comprising of a range of frames on which the annotation is created and an annotated frame within the range of frames is visible for viewing by one or more of other users annotating one or more other frames within the range of frames, and when a first user annotates a first video frame in a given video stream and a second user annotates a second video frame in the given streaming video, the second user receives a notification for a change of view from the second video frame to the first video frame, allowing the second user to further annotate the first video frame or continue to annotate the second video frame of the given streaming video.

7. The method of claim 6, further comprising:
connecting one or more mobile devices to the first group; and
connecting one or more mobile devices to the second group, wherein,
the one or more mobile devices in the first group, the second group, or both are configured to facilitate the one or more annotations of the one or more streaming videos in real-time.

8. The method of claim 7, wherein the one or more annotations comprise one or more text-based comments, one or more finger drawn comments, one or more symbols, one or more images, or any combination thereof.

9. The method of claim 7, wherein the one or more mobile devices in the first group, the one or more mobile devices in the second group, or both, are configured to receive real-time annotations by the other users in the first group, the other users in the second group, or both.

10. The method of claim 6, wherein
connecting the streaming server to the application server and with the one or more users in the first group, the one or more users in the second group, or both, and
when the one or more annotations are received from the application server, transmitting, by the streaming server, the one or more annotations in real-time to the one or more users in the first group, the one or more users in the second group, or both.

11. The method of claim 6, wherein each of the one or more streaming videos and each of the plurality of users form one or more types of annotations, each of the one or more types of annotations comprises a range, the range being one or more video frames in a given streaming video on which annotations are created and visible for each of the plurality of users associated therewith, allowing continuous annotations and viewing to the one or more video frames within the one or more streaming videos in real-time.

12. An apparatus configured to method for interactively annotating among a plurality of users, the apparatus comprising:
memory comprising instructions;
at least one processor, wherein
the instructions, when executed, are configured to cause the processor to
permit one or more users in a first group, one or more users in a second group, or both, to concurrently or sequentially annotate one or more streaming videos in real-time;
receive one or more annotations for the one or more streaming videos from the one or more users in the first group, the one or more users in the second group, or both;
simultaneously store the one or more annotations in database and transmit a frame associated with the one or more annotations to a streaming server, allowing other users in the first group, other users in the second group, or both, to view the frame associated with the one or more annotations in real-time; and
display a linear list via markers on a timeline when one of the markers is selected on the timeline, the linear list displaying one or more comments of the one or more annotations, user information associated with the one or more annotations, a range of frames associated with the one or more annotations, and coordinates associated with the one or more annotations; and the database comprising a plurality of groups, wherein each of the plurality of groups comprise a videos file and user file, the video file comprising the one or more streaming videos branching out from the video file and the user file comprising a plurality of users branching out from the user file, database creating a link between one of the one or more streaming videos and one of the plurality of users that annotated the one of the one or more streaming videos to facilitate collaboration between at least one of the plurality of users on any one of the one or more streaming videos within any one of the plurality of groups at the same time, each one of the plurality users and each of the one or more streaming videos form one or more annotations, each of the one or more annotations comprising of a range of frames on which the annotation is created and an annotated frame within the range of frames is visible for viewing by one or more of other users annotating one or more other frames within the range of frames, and when a first user annotates a first video frame in a given video stream and a second user annotates a second video frame in the given streaming video, the second user receives a notification for a change of view from the second video frame to the first video frame, allowing the second user to further annotate the first video frame or continue to annotate the second video frame of the given streaming video.

13. The apparatus of claim 12, wherein the instructions, when executed, are further configured to cause the processor to
connect one or more mobile devices to the first group; and
connect one or more mobile devices to the second group, wherein,
the one or more mobile devices in the first group, the second group, or both are configured to facilitate the one or more annotations of the one or more streaming videos in real-time.

14. The apparatus of claim 13, wherein the one or more annotations comprise one or more text-based comments, one or more finger drawn comments, one or more symbols, one or more images, or any combination thereof.

15. The apparatus of claim 13, wherein the one or more mobile devices in the first group, the one or more mobile devices in the second group, or both, are configured to receive real-time annotations by the other users in the first group, the other users in the second group, or both.

16. The apparatus of claim 12, wherein the instructions, when executed, are further configured to cause the processor to
connect the streaming server to the apparatus and with the one or more users in the first group, the one or more users in the second group, or both, and
when the one or more annotations are received from the apparatus, transmitting, by the streaming server, the one or more annotations in real-time to the one or more users in the first group, the one or more users in the second group, or both.

17. The apparatus of claim 12, wherein each of the plurality of files and each of the plurality of users form one or more types of annotations, each of the one or more types of annotations comprises a range, the range being one or more video frames in a given video stream on which annotations are created and visible for each of the plurality of users associated with the one or more streaming videos, allowing continuous annotations and viewing to the one or more video frames within the one or more streaming videos in real-time.

* * * * *